United States Patent [19]

Hill, Jr.

[11] 4,272,219
[45] Jun. 9, 1981

[54] VEHICLE TOWING APPARATUS

[76] Inventor: William M. Hill, Jr., 1414 N. Zang, Dallas, Tex. 75203

[21] Appl. No.: 13,439

[22] Filed: Feb. 21, 1979

Related U.S. Application Data

[63] Continuation of Ser. No. 836,360, Sep. 26, 1977, abandoned.

[51] Int. Cl.³ .............................................. B60P 3/12
[52] U.S. Cl. ................................... 414/563; 280/402
[58] Field of Search ..................... 414/563; 280/402

[56] References Cited

U.S. PATENT DOCUMENTS

| | | | |
|---|---|---|---|
| 2,793,770 | 5/1957 | St. Denis | 414/563 |
| 2,933,211 | 4/1960 | Smith | 414/563 |
| 3,762,585 | 10/1973 | Hobbs et al. | 414/563 |
| 4,010,858 | 3/1977 | Mahnke | 414/563 |

*Primary Examiner*—Robert G. Sheridan
*Attorney, Agent, or Firm*—Stanley R. Moore; Thomas L. Crisman

[57] ABSTRACT

A demountable hitch for quickly facilitating the engagement, lift and tow of one end of a vehicle which includes a transverse tow bar pivotally connected to a truck and a mounting rib upstanding thereon. The rib is demountably connected to a central portion of the tow bar and adapted for simple interlocking engagement of the towed vehicle rearwardly of the bumper thereon. The rib is encapsulated in a resilient material for increasing the frictional engagement with the bumper or vehicle frame to facilitate immediate towing while reducing the noise associated with the initial hook-up. In this manner a parked vehicle can be hitched and towed in a minimal amount of time and with a minimum of noise, which is particularly advantageous in times of emergency.

8 Claims, 8 Drawing Figures

VEHICLE TOWING APPARATUS

CROSS REFERENCE TO RELATED APPLICATION

This application is a continuation of prior application Ser. No. 836,360, filed Sept. 26, 1977, now abandoned.

BACKGROUND OF THE INVENTION

The invention relates to a towing sling hitch, and, more particularly, to a rib structure mountable on a conventional tow bar for facilitating expeditious towing of a vehicle.

Vehicle towing devices have been utilized for many years upon trucks conventionally referred to as wreckers. One object of wreckers is to engage a parked, wrecked or stranded vehicle and remove it to a desired location. Generally the tow device on the wrecker includes a lifting and towing sling of the type shown and described in U.S. Pat. No. 2,913,131, issued Nov. 17, 1959 to Gerald E. Holmes. Such structures utilize chains which extend from a transverse tow bar on the lower end of the sling to secure the vehicle to the sling. This is accomplished by positioning the wrecker adjacent the end of the vehicle to be lifted and disposing the sling contiguous the vehicle bumper. Then the chains are secured to the vehicle axle, or the like. From this position the vehicle end can be raised by the wrecker and towed therebehind.

It is not always possible or advantageous for the wrecker operator to expend lengthy amounts of time reaching under the vehicle to be towed to connect securing chains. Such a situation arises in times of wrecks and related forms of emergency wherein the critical factor is quickly engaging and towing the vehicle a limited distance. Other conditions may also merit expeditious towing. One such example is the repossession of vehicles by wrecker operators working for lien holders having a legal right to possess the vehicle. In this situation, the vehicle owner may manifest some degree of disapproval of such conduct with deleterious effects upon a wrecker operator who is apprehended thereby. It is therefore important for the wrecker operator to be able to quickly engage and tow repossessed vehicles with a minimum of noise and time.

The general trend in the development of prior art tow structures is that of facilitating the wide divergence of bumper configurations present on the contemporary vehicle. Present day automobiles have fragile bumpers including energy absorption frames and exposed body panels. Therefore, the designs of tow slings have been improved to provide hitches which can be used in such a manner as not to damage the vehicle in any way. For example longitudinally adjustable hooks have been disclosed in U.S. Pat. No. 3,858,734, issued Jan. 7, 1975 to Gerald E. Holmes. The hooks are slidable relative to longitudinal supporting members and coact with spurs projecting from the longitudinal members in such a way that the hooks engage suspension members of the vehicle. Such an improvement is particularly advantageous in safely towing a vehicle once the vehicle is in a location wherein ample time is provided for engagement therewith.

It would be an advantage, therefore, to provide vehicle towing apparatus which could effect quick, quiet engagement and towing of a vehicle to an ultimate location, or distant locale wherein a more permanent tow engagement, such as that defined above, can be effected. The apparatus of the present invention is designed for just such a purpose, wherein a mounting rib is provided for coupling to the standard transverse tow bar of a tow sling of any of several prior art constructions. The rib is provided with an energy absorbing coating for reducing noise and increasing friction. In this manner, prior art tow slings can be adapted for emergency vehicle engagement and towing while maintaining their capacity for towing engagement in a conventional fashion, once the emergency has been eliminated.

SUMMARY OF THE INVENTION

The invention relates to vehicle towing apparatus and a transverse tow bar which includes a mounting rib upstanding thereon. More particularly, one aspect of the invention includes apparatus for lifting and towing one end of a vehicle by a towing truck, comprising a transverse tow bar adapted for supportive engagement by the towing truck. A mounting rib is provided for upstanding from the tow bar and is adapted for engaging the vehicle to be towed rearwardly of and adjacent to a bumper thereon. The mounting rib comprises a rigid beam structurally connected to the tow bar in a manner providing demountable coupling thereto. In this manner the tow bar can be used with or without the mounting rib, depending on the circumstances.

In another aspect, the invention includes apparatus for lifting and towing one end of a vehicle by a towing truck, comprising a tow sling supported by the towing truck and including a transverse tow bar across the bottom thereof. A mounting rib is demountably coupled to the tow bar, in the center thereof, and upstanding therefrom in laterally rigid interconnection therewith. The mounting rib includes a beam section horizontally disposed upon the tow bar and coupled thereto with a rigid support arm extending therebetween.

In yet another aspect, the invention includes a mounting rib having a coating of energy absorbing material such as rubber provided thereon for reducing noise associated therewith during hitching and towing thereby. The tow bar further includes a drag sled centrally disposed on the bottom surface thereof and beneath the mounting rib for facilitating smooth interengagement between the towing truck and vehicle to be towed. The drag sled may include a wheel for further reducing noise and friction. Finally, the tow bar may include a pair of alignment springs secured thereto for selectable, aligned interengagement with the vehicle to be towed. In this manner, a parked vehicle can be hitched to and towed away with a minimum of noise and while situated at an angle relative to the tow truck.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION

Figure 1:
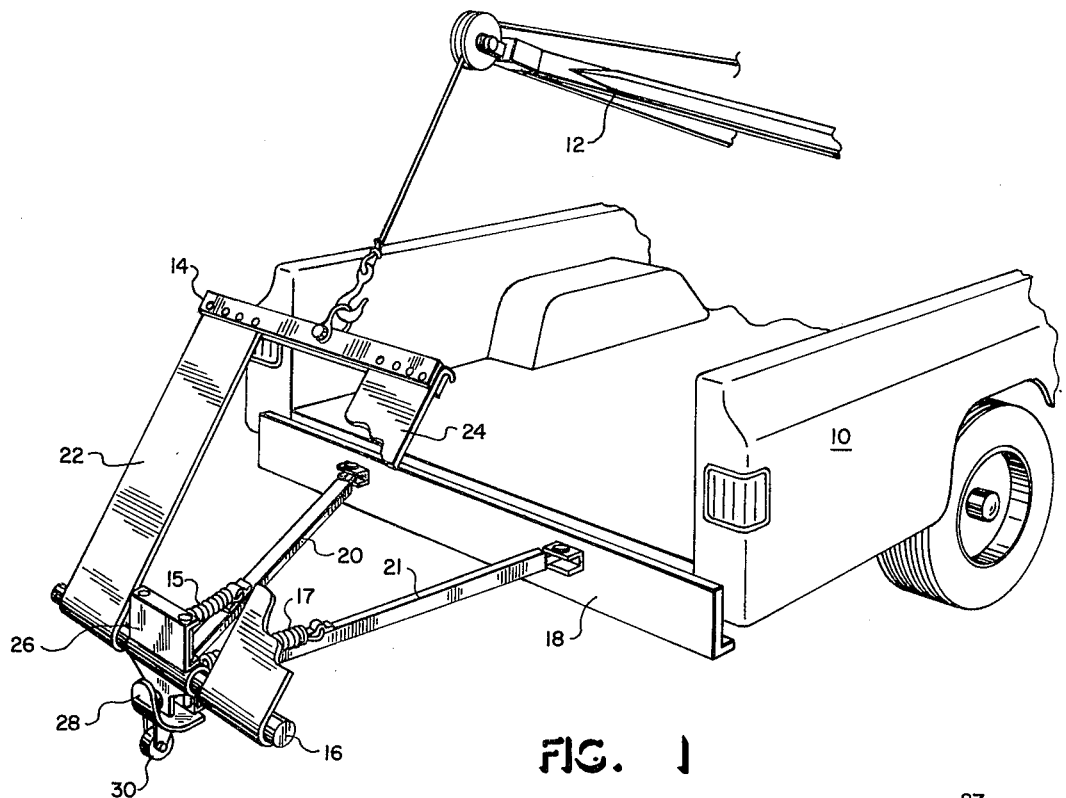
FIG. 1 is a perspective view of one embodiment of vehicle towing apparatus constructed in accordance with the principles of the present invention and with a tow truck shown in operative engagement therewith to illustrate the operation thereof.

Referring first to FIG. 1, there is shown a tow truck, or a wrecker 10 of conventional design, constructed with a boom 12 extending outwardly and upwardly thereon and supporting a tow sling 14 of the type including a tow bar 16. The tow bar 16 is disposed rearwardly of the wrecker 10 adjacent a bumper 18 thereon. To position the sling 14 and provide structural support for the tow bar, a pair of position arms 20 and 21 are provided in tapered interconnection therewith. The sling 14 further includes vehicle engagement belts, or straps, 22 and 24, forming the central body thereof. It is with this defined configuration that conventional wreckers engage, lift and tow vehicles, when vehicles engagement chains (not shown), or the like, are utilized. Such chains are referred to in the prior art discussion set forth in the background of the invention.

Still referring to FIG. 1, there is shown one embodiment of the apparatus of the present invention interconnected to and mounted upon the tow bar 16. The invention includes a mounting rib 26, shown in an upstanding configuration atop the tow bar 16. With the mounting rib 16, there is provided means for engaging a vehicle rearwardly of a bumper thereon for immediate towing thereof. Depending from the mounting rib 26 and secured to the tow bar 16, there is provided a skid 28 having a wheel or caster 30 depending therefrom. The caster 30 permits smooth and quiet engagement with the surface beneath the parked or stranded vehicle to be towed. The mounting rib 26 and caster 30 thus permit the wrecker 10 to quietly and efficiently engage a parked or stranded vehicle (not shown in FIG. 1) and tow it to a more desirable location with a minimum of noise and "hook-up" time. In addition, a pair of alignment springs 15 and 17 are provided between position arms 20 and 21, respectively, and the tow bar 16. The springs 15 and 17 are positionable thereupon for imparting tension to one or the other of opposite sides of the tow bar 16, pivotally mounted to the arms 20 and 21. The pivot mounting as shown in FIGS. 4–7 allow the tow bar 16 to be angulated by the springs 15 and 17 angulating the tow bar 16 into the most desirable orientation for vehicular engagement with the mounting rib 26.

Figure 2:
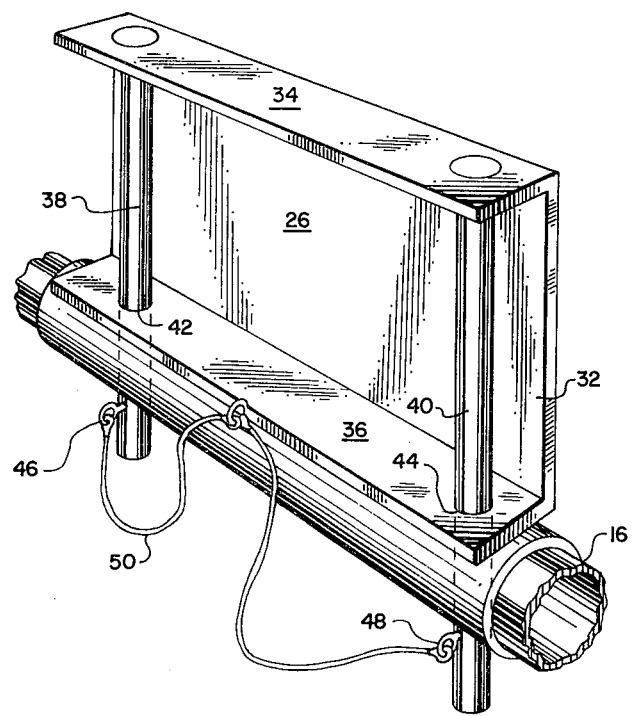
FIG. 2 is an enlarged, fragmentary view of the towing apparatus of FIG. 1, showing the mounting rib thereof in more detail.

Referring now to FIG. 2 there is shown an enlarged perspective view of the mounting rib 26 illustrated in FIG. 1. The mounting rib of this particular embodiment is comprised of a section of angle, or channel iron, having an intermediate body 32 and orthogonal side elements 34 and 36. A pair of suitably rigid bars 38 and 40 are constructed through the side elements 34 and 36 via holes formed therein in generally parallel spaced relationship, as shown. The bars 38 and 40 extend through the mounting rib 26 and depend downwardly therefrom for demountable interengagement with the tow bar 16. A pair of holes 42 and 44 are therefor formed in tow bar 16 in complementary spaced configuration with the mounting rib 26 for receiving bars 38 and 40 in structural interengagement therein. The mounting rib 26 is further secured to the tow bar 16 through interlocking pins 46 and 48 inserted into bars 38 and 40 after assembly to the tow bar 16. Pins 46 and 48 may be provided in the form of cotter pins, or the like, and are preferably affixed to the mounting rib 26 through a thread 50 connecting said pins for the convenience of the operator. In this manner the pins 46 and 48 are provided in a configuration not easily lost.

Figure 3:
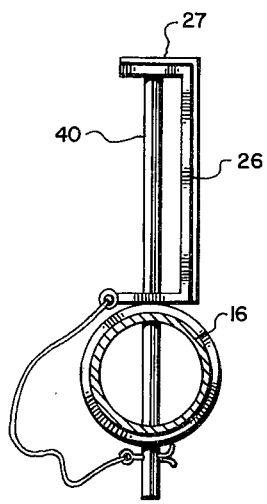
FIG. 3 is a side elevational view of the mounting rib of FIG. 2.
Figure 4:
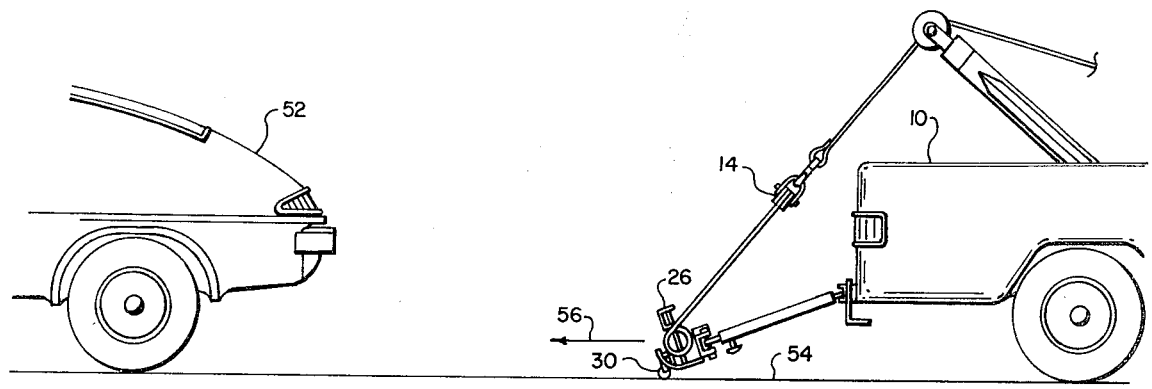
FIGS. 4, 5, 6 and 7 are side elevational views of the towing apparatus of FIG. 1 illustrating the method of engaging a vehicle therewith.

Referring now to FIG. 3 there is shown the mounting rib 26 in a side elevational view for illustrating in more detail the mounting thereof upon the tow bar 16. It may be seen that bars 38 and 40 are provided for engaging the tow bar 16 through both the bottom and the top surfaces thereof for complete structural support therefrom. The mounting rib 26 is also preferably coated with an energy absorbing substance 27 such as rubber, or the like, for providing a surface thereupon which is effective for increasing friction between the mounting rib 26 and the surface of the vehicle being engaged thereby. In addition, such an energy absorbing substance reduces the noise generally associated with the vehicular engagement of such a configuration. It may be seen that for more clandestine towing operations, such as those associated in repossession of vehicles, the reduced noise factor may become a predominant consideration.

Referring now to FIGS. 4 through 7 there is shown a series of steps illustrative of the utilization of the apparatus of the present invention. It may be seen in FIG. 4 that the wrecker 10 is simply aligned with the vehicle 52 to be towed, and the sling 14 of the wrecker 10 lowered to a vehicle-engaging configuration. The caster 30 is permitted to ride upon the surface 54 as the wrecker 10 moves in a rearwardly direction as indicated by the arrow 56. In this configuration, the mounting rib 26 may be seen to be in position for sliding easily under the vehicle 52 for engagement therewith.

Figure 5:
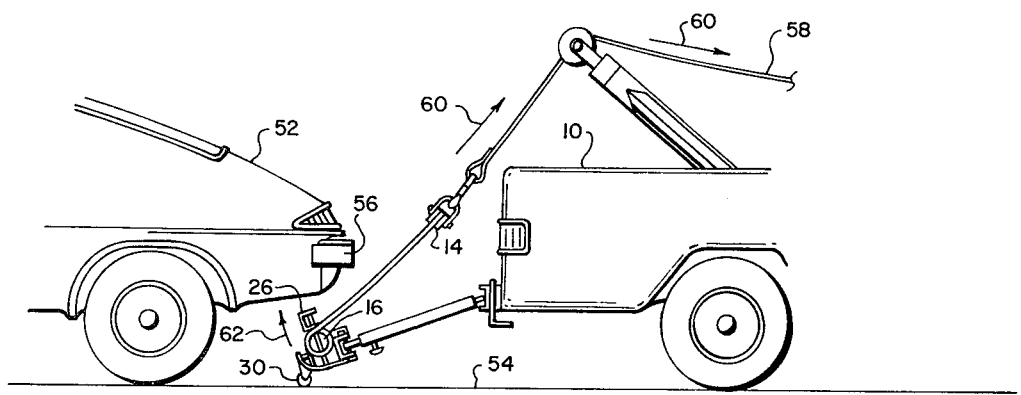

Referring now to FIG. 5 the wrecker 10 is stopped in position for engaging the vehicle 52 with the mounting rib 26 disposed immediately beneath and forwardly of the bumper 56 of the vehicle. The utilization of the caster 30 has provided this engagement orientation with a minimal amount of the noise generally associated with wrecker elements of the type normally dragged upon the surface 54. In this configuration the cable element 58 of the wrecker 10 is activated and pulled in the direction of the arrow 60 to cause sling 14 to assume a taut configuration and pull the tow bar 16 upwardly in the direction of arrow 62 for engaging the vehicle 52.

Figure 6:
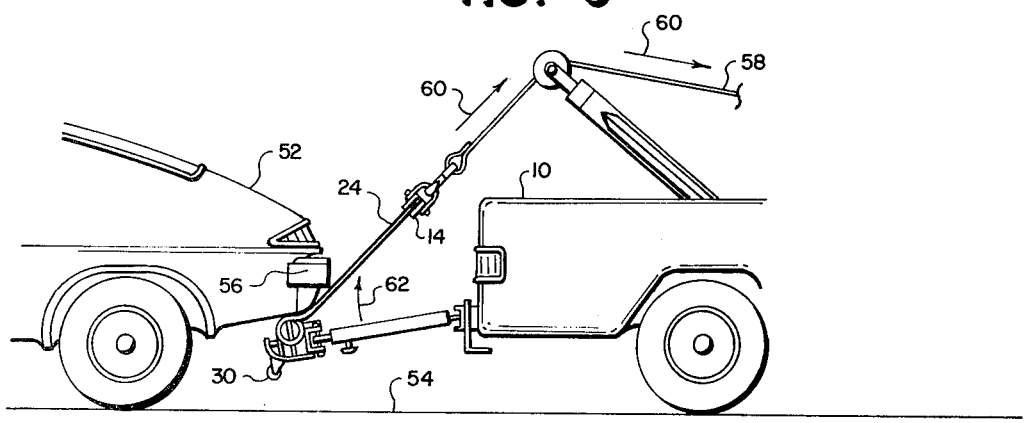
Figure 7:
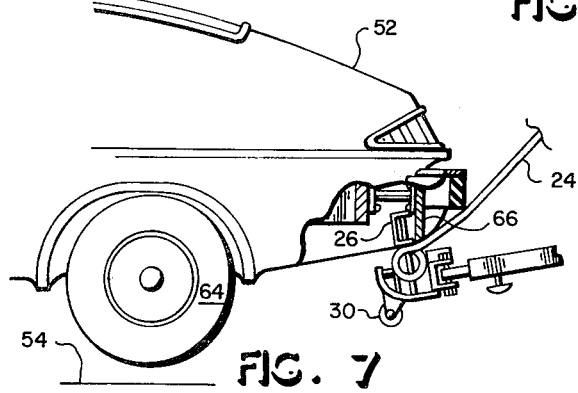

Referring now to FIG. 6 there is shown the wrecker 10 in vehicular engagement with the vehicle 52. As shown herein, mounting rib 26 (not shown) engages the vehicle 52 rearwardly of the bumper 56 thereon. In this position the caster 30 assumes a position above the surface 54 with the sling 14 engaging the vehicle 52 through the straps 22 and 24 thereon. Further movement of the cable 58 of the wrecker 10 in the direction of arrow 60 provides the desired lifting action of the vehicle 52 that is illustrated in FIG. 7. Referring now to FIG. 7 there is shown the vehicle 52 with its rearward wheels 64 disposed above surface 54, as is generally necessary for the towing thereof. A portion of the vehicle end fender has been removed for purposes of illustration whereby the mounting rib 26 is shown in rearwardly abutting engagement with the bumper frame member 66 of vehicle 52. The straps 22 and 24 of the sling 14 similarly engage the vehicle 52 across the bumper portion for the support thereof. In this interlocking configuration, the vehicle 52 may be immediately towed by the wrecker 10 without the conventional attachment devices such as the chains above referred to.

Figure 8:
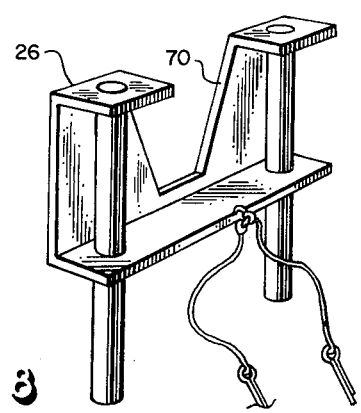
FIG. 8 is an alternative embodiment of the mounting rib of the towing apparatus shown in FIG. 1.

Referring now to FIG. 8 an alternative embodiment of the mounting rib 26 is shown wherein a center section 70 is provided in a generally V-shaped depression. V-section 70 permits engagement of certain vehicles having bumper support members in the vicinity of the desired vehicular engagement. Such bumper supports are found in older model cars or in vehicles having modified body structures.

Referring now to FIG. 7 it may be seen that any support member (not shown) extending between the bumper and bumper frame 66, therein referred to, could interfere with the flush engagement of the mounting rib 26 of the type shown and described in FIGS. 1 and 2. For this reason the mounting ribs 26 may be provided with such a V-section 70 for complementary engagement with said support members. The mounting rib 26 shown in FIG. 8 is also preferably coated with energy absorbing material as described above.

In operation the mounting rib 26 may be coupled to standard tow bars 16 of conventional mounting slings 14 of wreckers 10 with the simple addition of the holes 42 and 44 described above. In this manner conventional wreckers 10 may be adapted for utilization of the methods and apparatus of the present invention and the advantageous results thereof. Similarly, the mounting rib 26 may be carried inside the wrecker 10 for use in times of emergency, wherein quick towing is desirable. Such times may include emergencies and situations where chains or the like for secured attachment to the vehicle to be towed are not feasible. The mounting rib 26 is simply inserted into the tow bar 16 which is provided with holes 42 and 44 for immediate engagement and towing of the subject vehicle. Once the vehicle is removed to a more desirable location, a more permanent engagement utilizing such chains may be provided. In this mounting, the mounting rib 26 is preferably removed for subsequent use. In like manner, the skid 28 and caster 30 may be provided in a unitary construction for demountable engagement upon the tow bar 16.

It is thus believed that the operation and construction of the apparatus of the subject invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. Apparatus for directly lifting and towing one end of a vehicle between its chassis and bumper by a towing truck without the connection of conventional chains, said apparatus comprising:

a tow sling attached to the towing truck;

a transverse tow bar attached to said tow sling for supportive engagement by the towing truck;

a mounting rib upstanding from the tow bar said rib being in demountable coupling therewith for permitting utilization of said tow bar without said rib, adapted for engaging the vehicle to be towed adjacent to a bumper thereon and between the bumper and vehicle chassis, thereby securing said bumper to the tow truck for towing without the connection of the conventional chains; and said mounting rib comprising a stationary rigid beam structurally coupled to said tow bar and including a notched section formed centrally thereof for receiving structural frame members attached to said vehicle between its chassis and bumper for applying a horizontal force to the forward surface of the bumper to tow the vehicle.

2. The apparatus set forth in claim 1, wherein said tow bar is attached to a tow sling extending from and providing said supportive engagement by said towing truck, and wherein said apparatus also includes a pair of position arms structurally connecting said tow bar and said towing truck.

3. The apparatus set forth in claim 1, wherein said tow bar includes at least one hole formed therein and said mounting rib comprises said rigid beam having at least one arm depending therefrom and adapted for demountable interlocking engagement in said hole formed in said tow bar.

4. The apparatus set forth in claim 1 wherein said tow bar includes a pair of holes formed therein and said mounting rib comprises said rigid beam having a pair of arms depending therefrom in generally parallel spaced configuration, adapted for interlocking engagement in said holes formed in said tow bar.

5. The apparatus set forth in claim 1 wherein said mounting rib includes an outer coating of energy absorbent material for reducing vehicle engagement noise associated therewith.

6. The apparatus set forth in claim 1 wherein said mounting rib includes a section of channel iron having at least one arm depending from the bottom surface thereof and adapted for interlocking engagement with said tow bar.

7. The apparatus set forth in claim 1 wherein said tow bar further includes a drag wheel centrally disposed on the bottom surface thereof and beneath said mounting rib for facilitating quiet interengagement between the towing truck and vehicle to be towed.

8. The apparatus set forth in claim 2 wherein said tow bar includes a pair of alignment springs, each of said pair of springs being connected at a first end to said tow bar and at a second end to one of said position arms at an intermediate point thereon between said tow bar and said towing truck for angulating said tow bar.

* * * * *